(12) United States Patent
Boyle et al.

(10) Patent No.: US 6,347,914 B1
(45) Date of Patent: Feb. 19, 2002

(54) ROTARY TOOL HOLDER

(75) Inventors: David C. Boyle, Severna Park; Timothy T. McKenzie, Baltimore, both of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/521,936

(22) Filed: Mar. 9, 2000

(51) Int. Cl.$^7$ .............................................. B23B 31/107
(52) U.S. Cl. ..................... 408/240; 408/239 A; 408/226
(58) Field of Search .............................. 279/14, 29, 74, 279/75, 82; 408/238, 239 R, 240

(56) References Cited

U.S. PATENT DOCUMENTS

| | | |
|---|---|---|
| 632,560 A | 9/1899 | Furbish et al. |
| 2,395,534 A | 2/1946 | Cook |
| 2,678,826 A * | 5/1954 | Nick .............................. 279/48 |
| 2,680,636 A | 6/1954 | Griffin |
| 3,378,905 A | 4/1968 | Szohatky |
| 3,436,086 A * | 4/1969 | Glenzer ........................ 279/30 |
| 3,893,677 A | 7/1975 | Smith |
| RE28,662 E | 12/1975 | Bilz et al. |
| 4,188,041 A | 2/1980 | Soderberg |
| 4,299,402 A | 11/1981 | Hoffman |
| RE31,755 E | 12/1984 | Wanner et al. |
| 4,573,839 A * | 3/1986 | Finnegan ................. 408/239 R |
| 4,676,703 A * | 6/1987 | Swanson ................. 408/239 R |
| 4,692,073 A * | 9/1987 | Martindell .................... 408/239 |
| 4,701,083 A | 10/1987 | Deutschenbaur et al. |
| 4,953,640 A | 9/1990 | Kurt |
| 5,005,843 A | 4/1991 | Markle et al. |
| 5,011,344 A | 4/1991 | Johnson |
| 5,013,194 A * | 5/1991 | Wienhold ..................... 408/240 |
| 5,152,541 A * | 10/1992 | Baumgartner et al. ......... 279/8 |
| 5,188,378 A | 2/1993 | Erlenkeuser |
| 5,276,929 A | 1/1994 | Mitchell |
| 5,470,180 A | 11/1995 | Jore |
| 5,586,847 A | 12/1996 | Mattern, Jr. et al. |
| 5,651,647 A | 7/1997 | Ray |
| 5,779,404 A | 7/1998 | Jore |
| 6,062,575 A * | 5/2000 | Mickel et al. ................. 279/75 |

FOREIGN PATENT DOCUMENTS

| | | |
|---|---|---|
| DE | 2413021 | 10/1975 |
| DE | 3243389 | 5/1984 |
| DE | 9403686.1 | 7/1994 |
| EP | 685300 | 12/1995 |

* cited by examiner

Primary Examiner—Henry Tsai
Assistant Examiner—Terrence Washington
(74) Attorney, Agent, or Firm—Harness, Dickey & Pierce, P.L.C.

(57) ABSTRACT

A tool holder for releasably coupling a bit with a non-circular outer connector surface to a rotary driver. The tool holder includes a socket and a retaining mechanism coupled to the socket and operable in a retaining mode and a released mode. The socket includes a forward end with an opening extending rearwardly from the forward end. The opening also includes a non-circular cross-section adapted to receive the outer connector surface of the bit to couple the bit for rotation with the socket. The retaining mechanism is adapted to permit disposable of the bit into an operative position within the opening and to prevent axial movement of the bit out of its operative position when the retaining mechanism is in its retaining mode. The retaining mechanism is further adapted to permit axial displacement of the bit out of its operative position when the retaining mechanism is in its released mode. The retaining mechanism includes a sleeve coupled to the socket for displacement toward the forward end of the socket from a locked position to an unlocked position thereby moving the retaining mechanism from its retaining mode into its released mode. The retaining mechanism also includes a spring biasing the sleeve into its locked position.

15 Claims, 4 Drawing Sheets

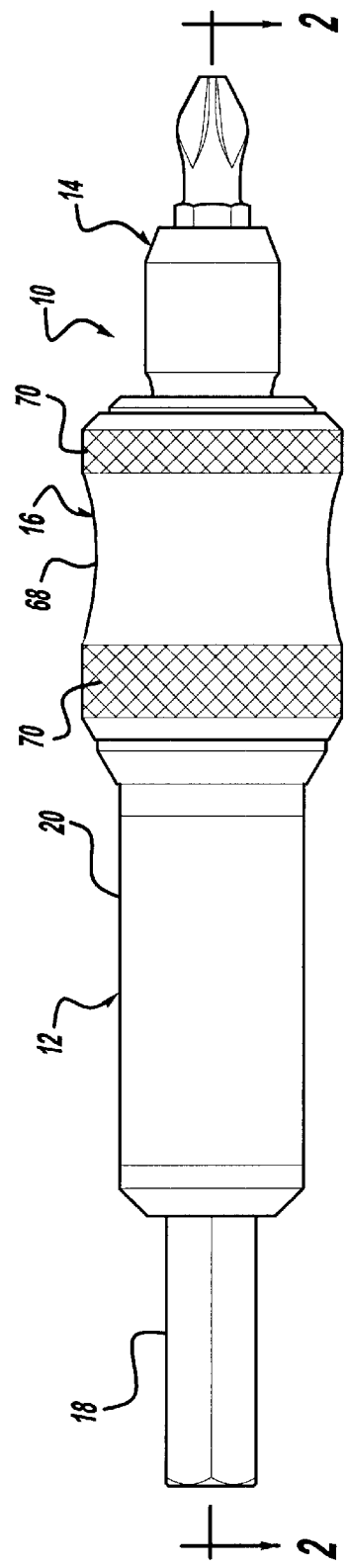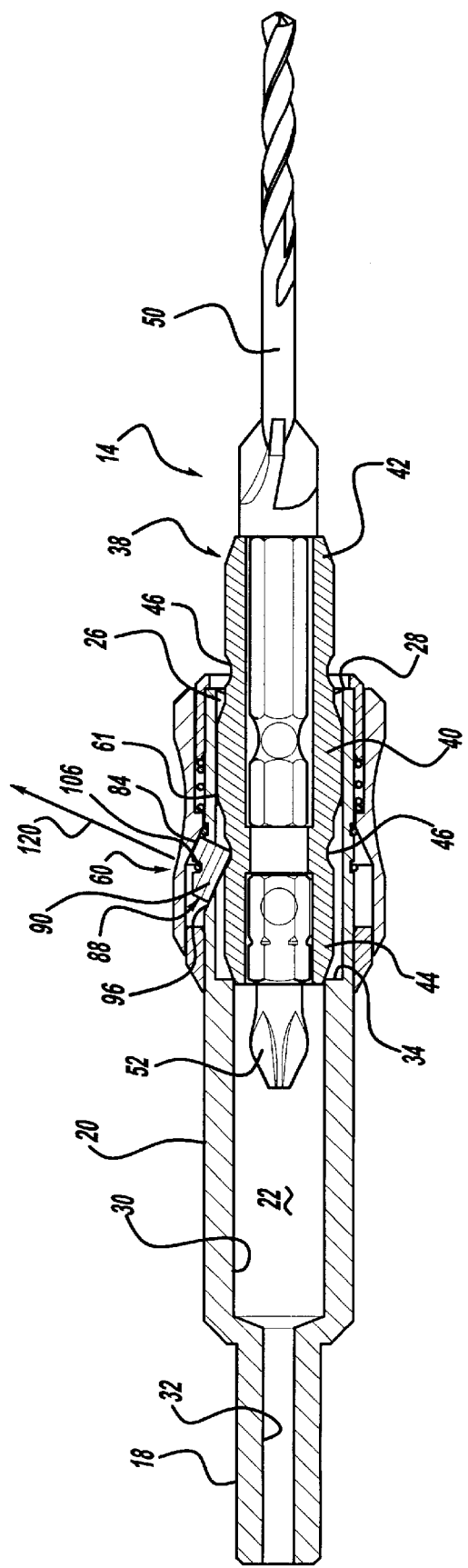

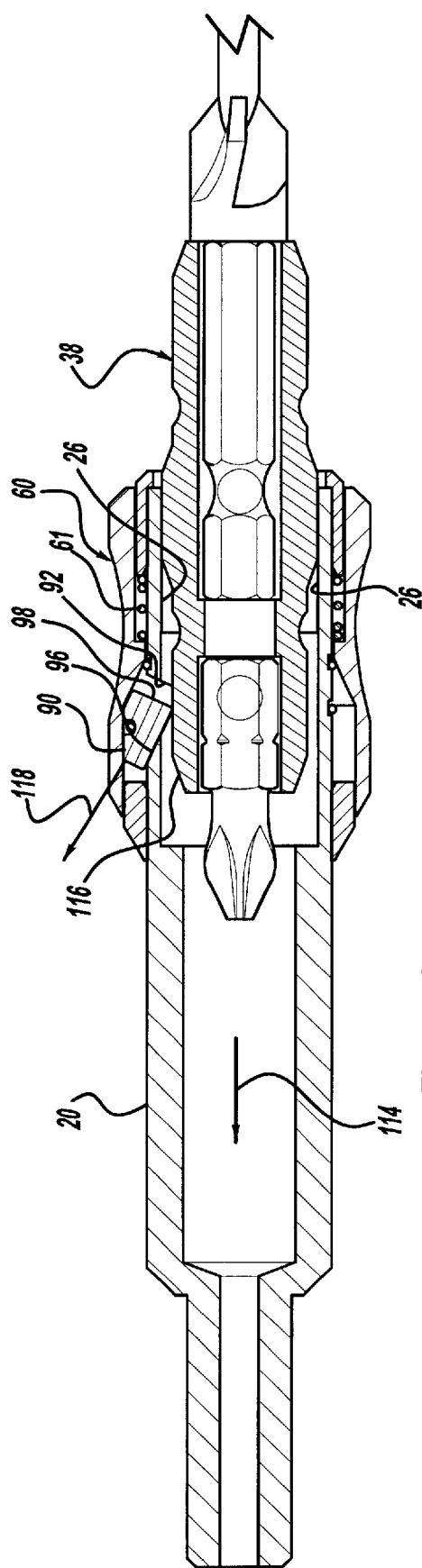
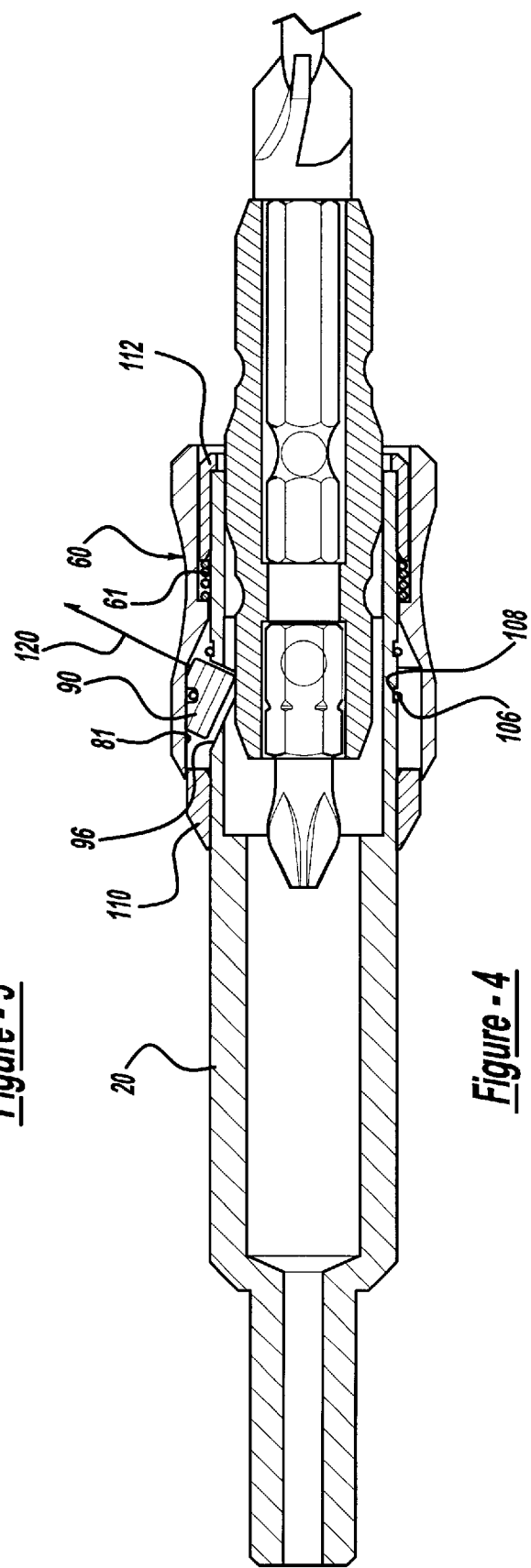
*Figure - 3*
*Figure - 4*

ROTARY TOOL HOLDER

BACKGROUND OF THE INVENTION

1. Technical Field

The present invention relates generally to a tool holder for use with a rotary driver such as a drill and, more particularly, to an improved retaining mechanism for such a tool holder.

2. Discussion

Tool holders for rotary drivers such as drills are generally known in the art. Some tool holders directly couple bits, such as drilling bits or screw driving bits, to the rotary driver. Other holders couple reversible tools to the driver. U.S. Pat. No. 5,779,404 to Jore entitled "Reversible Drill/Driver Tool" is representative of the latter holders.

Tool holders generally include a drive body having a shank at one end and a socket at the other. The socket is configured to accommodate the bit and a retaining mechanism is coupled to the socket to releasably couple the bit or bit holder to the socket for rotation with the tool holder. Prior art retaining mechanisms commonly include a retaining ball or spring that protrudes into the socket to couple the bit or bit holder to the socket. A sleeve or collar is axially movable along the socket between a locked position wherein the ball is maintained in its engaged position and an unlocked position wherein an annular recess in the sleeve or collar is aligned with the ball or spring to allow the ball or spring to move to a disengaged position and permit removal of the bit or bit holder from the socket.

One of the disadvantages of many prior art tool holders is that the sleeve or collar must be in its unlocked position to permit the bit to be moved into the socket. Accordingly, when an operator desires to couple the bit to the tool holder, the operator must first determine whether the sleeve is in its locked or unlocked position. If the sleeve is in its locked position, the operator must move the sleeve to its unlocked position prior to disposing the bit holder within the socket. Finally, after positioning the bit holder in the socket, the operator must move the sleeve to its locked position.

Further deficiencies in the prior art include retaining mechanism configurations that require two distinct movements to remove the bit holder from the socket. For example, some retaining mechanisms require rearward movement of the sleeve into its unlocked position followed by forward displacement of the bit holder away from the socket to effectuate removal. This bi-directional displacement sequence is undesirably inefficient.

SUMMARY OF THE INVENTION

It is an object of the present invention to provide a tool holder having a retaining mechanism that permits a bit to be disposed within and coupled to the socket when the retaining mechanism sleeve is in its locked position.

A further object of the present invention is to provide a retaining mechanism having a sleeve and a spring that normally biases the sleeve into its locked position thereby effectively retaining a bit in driving engagement with the socket when the bit is disposed therein.

Yet another object of the present invention is to provide a retaining mechanism having a key that is disposed within a slot in the socket for movement between an engaged position and first and second disengaged positions. The key is in operative engagement with a retaining sleeve that is biased to its normal locked position yet moveable into an unlocked position. When the sleeve is in either its locked or unlocked positions, the sleeve is configured to permit the key to move to its first disengaged position to allow insertion of a bit within the socket. Further, the sleeve prevents movement of the key to its second disengaged position when the sleeve is in its normally locked position thereby retaining the bit holder to the socket.

A still further object of the present invention is to provide a retaining mechanism wherein the sleeve is rearwardly biased into its locked position such that forward movement of the sleeve against the bias places the sleeve in its unlocked position and allows the operator to displace the sleeve and the bit in the same axial direction and remove the bit from the socket in an efficient, and preferably one-handed, operation.

In view of the above, the present invention includes a tool holder for releasably coupling a bit with a non-circular outer connector surface to a rotary driver. The tool holder includes a socket and a retaining mechanism coupled to the socket and operable in a retaining mode and a released mode. The socket includes a forward end with an opening extending rearwardly from the forward end. The opening also includes a non-circular cross-section adapted to receive the outer connector surface of the bit to couple the bit for rotation with the socket. The retaining mechanism is adapted to permit disposable of the bit into an operative position within the opening and to prevent axial movement of the bit out of its operative position when the retaining mechanism is in its retaining mode. The retaining mechanism is further adapted to permit axial displacement of the bit out of its operative position when the retaining mechanism is in its released mode. The retaining mechanism includes a sleeve coupled to the socket for displacement toward the forward end of the socket from a locked position to an unlocked position thereby moving the retaining mechanism from its retaining mode into its released mode. The retaining mechanism also includes a spring biasing the sleeve into its locked position.

Further scope of applicability of the present invention will become apparent from the detailed description given hereinafter. It should be understood however that the detailed description and specific examples, while indicating preferred embodiments of the invention are intended for purposes of illustration only, since various changes and modifications within the spirit and scope of the invention will become apparent to those skilled in the art from the following detailed description.

BRIEF DESCRIPTION OF THE DRAWINGS

The present invention will become more fully understood from the following detailed description and the accompanying drawings wherein:

FIG. 1 is a side elevational view of a rotatable tool with a tool holder according to the present invention;

FIG. 2 is a sectional view taken along the line 2—2 shown in FIG. 1 and illustrating the retaining mechanism in its retaining mode, the sleeve in its locked position, and the key in its engaged position;

FIG. 3 is a sectional view taken along the same line as FIG. 2 with the sleeve illustrated in its locked position and the key displaced into its first disengaged position by insertion of the bit holder;

FIG. 4 is a sectional view taken along the same line as FIGS. 2 and 3 illustrating the retaining mechanism in its released mode, the sleeve in its unlocked position, and the key displaced into its second disengaged position by removal of the bit holder;

DETAILED DESCRIPTION OF THE PREFERRED EMBODIMENT

Figure 5:
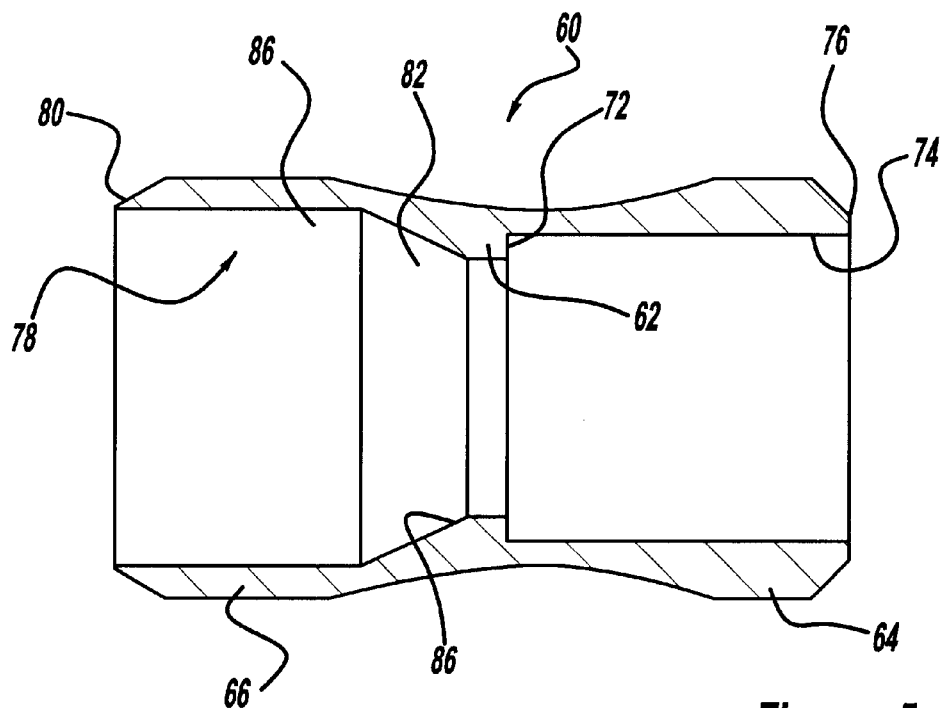
FIG. 5 is a longitudinal or axial sectional view of the sleeve.

With reference to FIGS. 1 and 2, a rotatable tool 10 is generally illustrated to include a tool holder 12 and a bit assembly 14. The tool holder 12 includes a retaining mechanism 16, that is normally biased into a retaining mode (FIG. 2) to prevent axial removal of the bit assembly 14 from the tool holder 12 but allows insertion of the bit assembly 14 therewithin. The retaining mechanism 16 is movable into a released mode (FIG. 4) wherein the bit assembly 14 is removable from the holder body.

The tool holder 12 includes a shank 18 integral with and extending rearwardly from a socket 20. The exterior of the shank 18 is preferably hex-shaped (FIG. 1) for coupling to a drive mechanism such as the chuck of a rotary drill. The tool holder 12 includes a passage 22 (FIG. 3) extending through the socket 20 and shank 18. The passage 22 is defined, in part, by a hex-shaped opening 26 extending rearwardly from a first end 28 of socket 20. Further, a reduced diameter bore 30 communicates with opening 26 and an even smaller axial passage 32 formed in shank 18. The decrease in size between the opening 26 and bore 30 defines an annular shoulder 34.

Bit assembly 14 includes first and second bits 50 and 52 secured to a bit holder 38. The bit holder 38 includes a middle segment 40 having an outer surface that is configured for driving engagement with hex-shaped opening 26. Middle segment 40 is flanked by first and second outer sections 42 and 44 that are preferably cylindrical in shape. Each of the first and second outer sections 42 and 44 include circumferential grooves 46 that are positioned for engagement with the retaining mechanism 16 as hereinafter described. Thus, the bit holder 38 may be disposed within the socket 20 such that one of the first and second bits 50 and 52 extend from the tool holder for operative engagement with a work piece.

Figure 7:
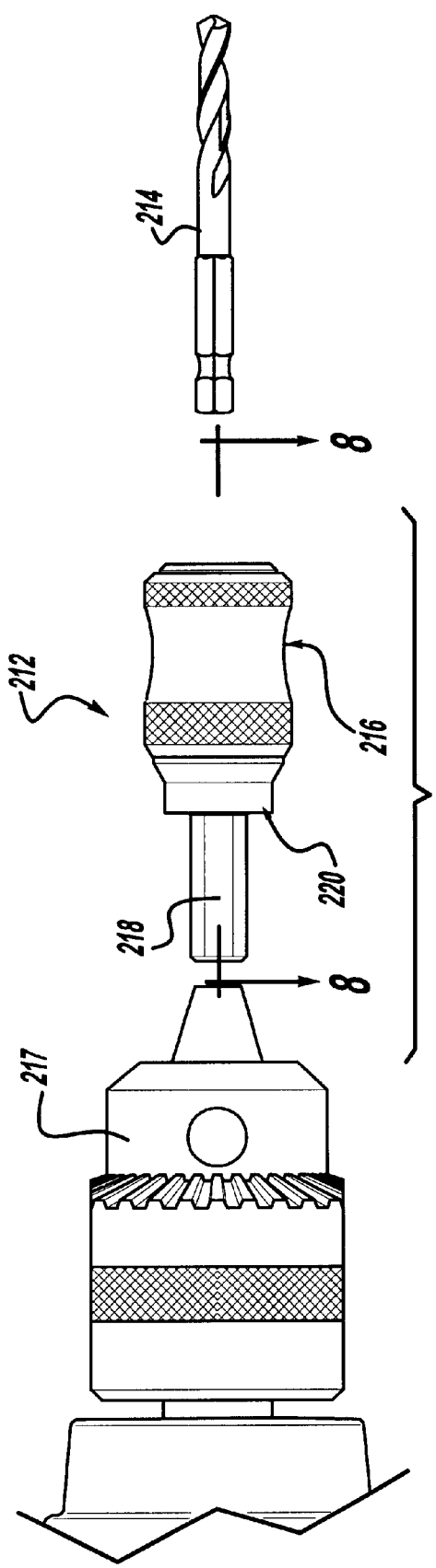
FIG. 7 is a side elevational view of a tool holder according to another embodiment of the present invention and illustrates a drill bit about to be inserted into the tool holder.
Figure 8:
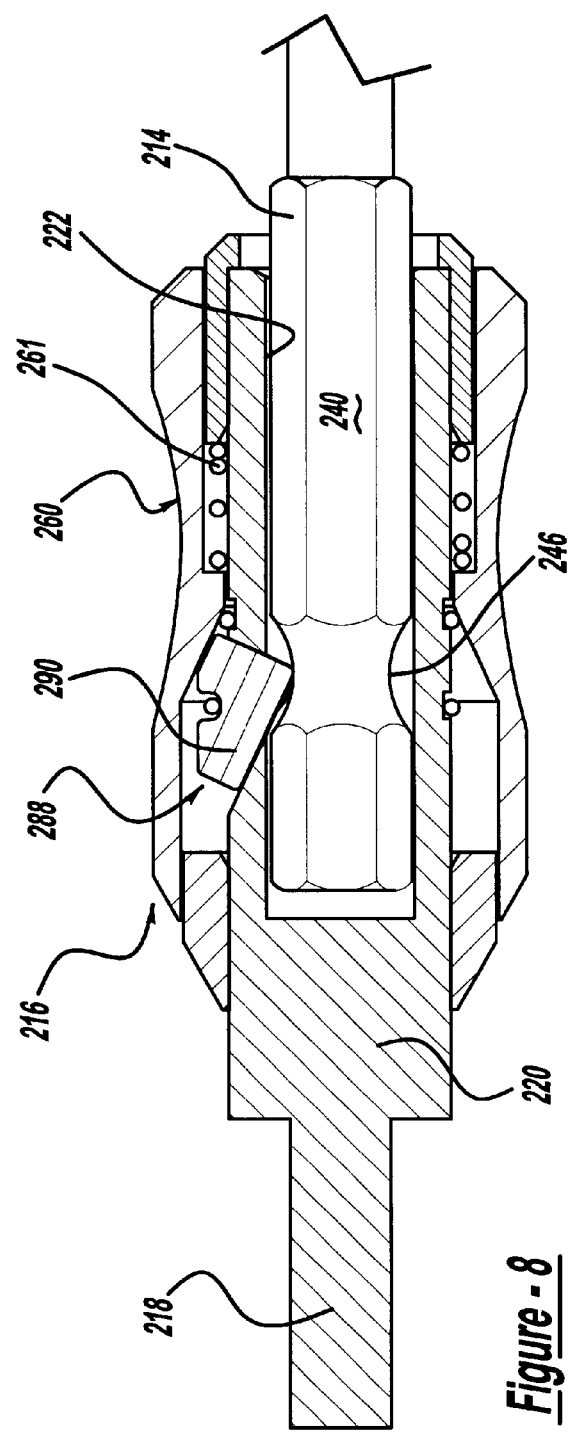
FIG. 8 is a sectional view taken generally along the line 8—8 of FIG. 7 illustrating the drill bit fully inserted into the tool holder.

It should be appreciated that while the tool holder 12 of the present invention is described with particular reference to the reversible bit assembly 14 in FIGS. 1–6, the tool holder may also be used in a variety of other tool coupling environments. For example, as is illustrated in FIGS. 7 and 8, an alternative embodiment of the tool holder 212 and retaining mechanism 216 may be used to allow the operator to efficiently connect and disconnect any bit or tool to a driver such as a drill. In fact, the tool holder may be used to connect virtually any type of rotary bit with a hex-shaped shank and a groove in the shank directly to a rotatable driver.

As noted above, the retaining mechanism 16 releasably couples the bit assembly 14 to the tool holder 12 when the retaining mechanism is in its retaining mode yet allows the operator to remove the bit assembly from the tool holder in a smooth and efficient manner. More particularly, the bit assembly 14 is removable from the tool holder 12 through forward movement of a retaining mechanism sleeve and corresponding forward movement of the bit assembly 14. This coordinated, unidirectional removal operation allows the operator to easily remove the bit from the tool holder and, preferably, perform such removal with a single hand.

The retaining mechanism includes a sleeve 60, a spring 61, and a detent mechanism 88. The sleeve 60 is coupled to the outer surface of the socket 20 for sliding axial movement therealong between its locked position (FIGS. 2 and 3) when the retaining mechanism is in its retaining mode and its unlocked position (FIG. 4) when the retaining mechanism is in its released mode. The spring 61 biases the sleeve 60 toward its locked position and therefore the retaining mechanism 16 into its retaining mode. The detent mechanism includes a key 90 and a detent spring or snap ring 106. The key 90 is disposed for sliding movement between an engaged position (FIG. 2) and first and second disengaged positions (FIGS. 3 and 4, respectively) relative to a key slot 92 (FIG. 3) in the socket 20. The detent spring 106 biases the key into its engaged position.

In general, the configuration of the sleeve 60 and detent mechanism 88 provide many of the benefits discussed above. For example, the sleeve is biased into its locked position wherein the sleeve configuration permits the bit assembly to displace the key 90 from its engaged position and into its first disengaged position (FIG. 3) during insertion of the bit into its operative position (FIG. 2) within the socket opening 26. In its locked position, the sleeve also prevents displacement of the key 90 from its engaged position to its second disengaged position under forces tending to remove the bit assembly 14 from its operative position. Finally, an operator may displace the sleeve 60 into its unlocked position (FIG. 4) wherein movement of the bit assembly of the socket opening 26 displaces the key 90 into its second disengaged position.

As is most clearly illustrated in FIG. 5, the sleeve includes a central shoulder 62 and collars 64 and 66 extending forwardly and rearwardly therefrom, respectively. The inner surface of the sleeve includes a constant diameter recess 74 extending from a spring seat 72 defined by central shoulder 62 (FIG. 5) to the forward face 76 of the forwardly extending collar 64. In a similar manner, the inner surface of sleeve 60 defines a rear recess 78 extending from shoulder 62 to the terminal end 80 of rearwardly extending collar 66. Rear recess 78 includes a conical section 82 adjacent central shoulder 62 that is defined by a slanted face 84 radially diverging from shoulder 62. Rear recess 78 also includes a cavity 86 extending from conical section 82 to terminal end 80. Finally, as is best illustrated in FIG. 1, the outer surface of sleeve 60 includes a concave depression 68 extending between knurled sections 70 to facilitate movement of the sleeve from its normal locked position to its unlocked position such as through manipulation by the operator's thumb.

Figure 6:
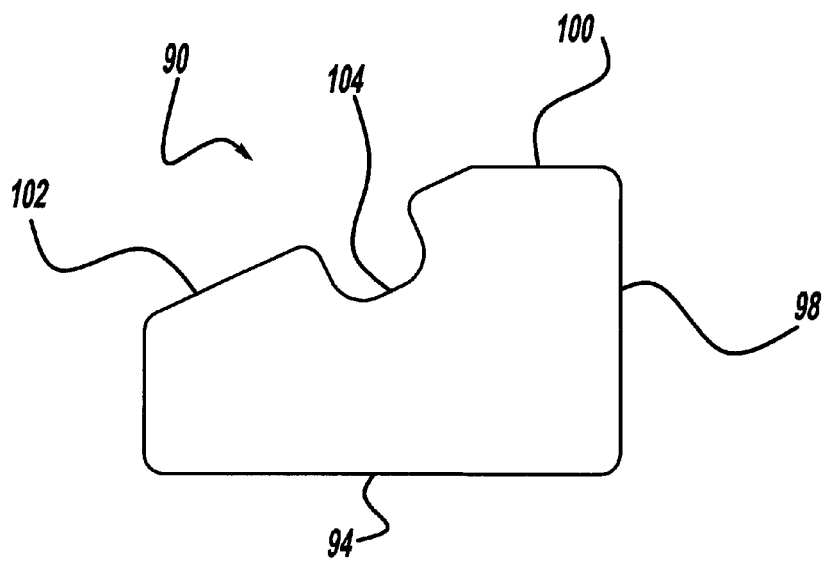
FIG. 6 is a side elevational view of the key.

As shown in FIG. 6, the key 90 of detent mechanism 88 includes a bottom face 94 that is slidable along a slanted bearing surface 96 (FIG. 3) adjacent the slot 92. The key 90 also includes a forward face 98, a top face 100, a slanted face 102, and a spring recess 104 between the slanted face 102 and top face 100. The detent spring 106 (FIG. 2) is disposed within spring recess 104 and a circumferential snap groove 108 (FIG. 4) in the outer surface of the socket 20.

It should be noted for completeness that the tool holder 12 further includes rear and front press collars 110 and 112, respectively, (FIG. 4) for securing the sleeve for sliding movement along the outer surface of the socket.

With the above description of the structure of the tool holder in mind, the operation thereof will now be described in greater detail with respect to FIGS. 2, 3, and 4. As noted above, the spring 61 normally biases the sleeve into its locked position and the spring 106 normally biases the key 90 into its engaged position (FIG. 2). Insertion of the bit holder 38 is permitted when the sleeve 60 is in its locked or unlocked position. More particularly, as is best illustrated in FIG. 3, during axial insertion of the bit holder 38 in the direction of arrow 114 and into the hex-shaped opening 26, a displacing face 116 of the bit holder engages the forward face 98 of the key 90 and slidably displaces the key in the direction of arrow 118 and along the socket bearing surface 96 into its first disengaged position.

When the bit holder 38 is fully inserted into the socket 20, i.e., the bit assembly 14 is in its operative position relative to the tool holder 12, the detent spring 106 biases the key 90 into engagement with one of the circumferential grooves 46 formed on the outer surface of the bit holder. In this position, if the operator or drilling forces act in the direction opposite arrow 114, the attempted removal of the bit assembly 14 tends to displace the key 90 in a direction indicated by arrow 120 (FIG. 2). Such key displacement is prevented through engagement of the top key face 100 (FIG. 6) with the slanted face 84 of the sleeve 60 (FIG. 2) and the key retains the bit holder 38 in the socket 20. If the operator desires to remove the bit holder, the operator simply displaces the sleeve in a forward direction against the bias of the spring 61 thereby placing the cavity 86 in operative alignment with the key 90 (FIG. 4). The key 90 is then allowed to move in the direction of arrow 120 into its second disengaged position under the urging of the bit holder 38, as illustrated in FIG. 4, thereby allowing removal of the bit holder.

One skilled in the art will appreciate that the reversible tool and retaining mechanism of the present invention provides many benefits over the prior art. These benefits include allowing the releasable coupling of the bit assembly 14 to the tool holder 12 when the sleeve 60 is in either its locked or unlocked positions. Moreover, the biasing of the sleeve 60 into its locked position ensures that the retaining mechanism 16 is not inadvertently left in an unlocked position where the bit holder may be easily removed from the drive body. Additionally, the retaining mechanism is configured such that the key 90 is movable from its engaged position to its first disengaged position through sliding movement in a first direction indicated by arrow 118 and is movable from its engaged position to its second disengaged position in a second direction indicated by arrow 120 that is approximately orthogonal to the first direction 118.

Further, the forward movement of the sleeve 60 from its locked position to its unlocked position allows the key 90 to be displaced to its second disengaged position and the operator to efficiently remove the bit assembly 16 from the socket 20 through coordinated, and preferably one-handed, axial movement of the sleeve 60 and the bit assembly 14. More particularly, many prior art tool holders require rearward movement of the retaining sleeve to place the sleeve in its unlocked position. The bit assembly must then be moved in the opposite direction to disassemble the tool. Conversely, the tool holder of the present invention is configured such that the sleeve and bit assembly are each moved in the same forward axial direction to place the sleeve in its unlocked position and to remove the bit assembly from the socket. This unidirectional movement provides more efficient and coordinated operation of the tool.

Turning now to FIGS. 7 and 8 wherein the tool holder of the present invention, including the retaining mechanism thereof, is shown incorporated into a quick-acting tool bit holder 212 for releasably coupling a bit 214 to the tool holder socket 220. More particularly, as illustrated in FIG. 7, the tool holder 212 is adapted to releasably couple the bit 214 to a rotary driver 217 and to achieve all of the benefits recited above. In a manner consistent with the description of the retaining mechanism provided above with reference to FIGS. 1–6, the retaining mechanism 216 illustrated in FIG. 8 includes a sleeve 260, spring 261, and detent mechanism 288 which is illustrated in its engaged mode to retain the bit 214 within a passage 222 defined by socket 220. The detent mechanism 288 includes a key 290 that engages a circumferential groove 246 formed in hex shank 240 of bit 214. The tool holder 212 includes a shank 218 that is connectable to the rotary driver 217. From the above description referencing FIGS. 7 and 8 as well as the disclosure relating to FIGS. 1–6, it should be appreciated that the retaining mechanism of the present invention may be used in a variety of environments to provide the benefits discussed herein.

The invention being thus described, it will be obvious that the same may be varied in many ways. Such variations are not to be regarded as a departure from the spirit and scope of the invention, and all such modifications as would be within the knowledge of one skilled in the art are intended to be included within the scope of the following claims.

What is claimed is:

1. A tool holder for releasably coupling a bit with a non-circular outer connector surface to a rotary driver, comprising:

a socket having a forward end and an opening extending rearwardly from said forward end, said opening having a non-circular cross section adapted to receive the outer connector surface of the bit to couple the bit for rotation with the socket;

a retaining mechanism coupled to said socket and operable in a retaining mode and a released mode, said retaining mechanism adapted to permit disposal of the bit into an operative position within the opening and to prevent axial displacement of the bit out of its operative position when the retaining mechanism is in its retaining mode, said retaining mechanism further adapted to permit axial displacement of the bit out of its operative position when the retaining mechanism is in its released mode, said retaining mechanism including a sleeve and a spring, said sleeve coupled to said socket for displacement toward said forward end of said socket from a locked position to an unlocked position to move said retaining mechanism from said retaining mode to said released mode, said spring biasing said sleeve into its locked position; and wherein said retaining mechanism includes a detent mechanism movable between an engaged position and first and second disengaged positions, wherein said socket includes a slot communicating with said opening, wherein said detent mechanism is adapted to extend through said slot and into said opening to engage the bit and prevent axial removal of the bit from its operative position when the detent mechanism is in its engaged position.

2. The tool holder of claim 1 wherein said detent mechanism is adapted to permit insertion of the bit into the opening when the detent mechanism is in its first disengaged position, wherein said detent mechanism is further adapted to permit removal of the bit from the opening when the detent mechanism is in its second disengaged position, wherein said detent mechanism is displaceable from its engaged position to its first disengaged position when the retaining mechanism is in its retaining mode, wherein said sleeve prevents displacement of said detent mechanism from its engaged position to its second disengaged position when said retaining mechanism is in said retaining mode, and wherein said detent mechanism is displaceable from its engaged position to its second disengaged position when the retaining mechanism is in its released mode.

3. The tool holder of claim 2 wherein said socket includes a slanted bearing surface extending rearwardly from said slot, wherein said detent mechanism includes a key disposed in said slot, said key positioned to engage the bit during insertion of the bit into said opening and to be displaced by the bit to slide along said bearing surface from the engaged position to the first disengaged position.

4. The tool holder of claim 2 wherein said detent mechanism is movable in a first direction from its engaged position to its first disengaged position and in a second direction generally orthogonal to said first direction from its engaged position to its second disengaged position.

5. A tool holder for releasably coupling a bit with a non-circular outer connector surface to a rotary driver, comprising:

a socket having a forward end and an opening extending rearwardly from said forward end, said opening having a non-circular cross section adapted to receive the outer connector surface of the bit to couple the bit for rotation with the socket;

a sleeve displaceable axially along said socket between a locked position and an unlocked position;

a spring biasing said sleeve toward its locked position;

a detent mechanism having a detent spring, said detent mechanism extending into said opening and adapted to engage the bit and prevent axial removal of the bit from the opening when said detent mechanism is in an engaged position;

said detent mechanism being movable between its engaged position to first and second disengaged positions, said sleeve preventing movement of said detent mechanism from its engaged position into its second disengaged position while permitting movement of said detent mechanism from its engaged position into its first disengaged position when said sleeve is in its locked position, said sleeve permitting movement of said detent mechanism from its engaged position to its second disengaged position when said sleeve is in its unlocked position.

6. The tool holder of claim 5 wherein said detent mechanism includes a key and said socket includes a slot communicating with said opening and a slanted surface extending rearwardly from said slot, and wherein said key slides along said slanted surface when the detent mechanism is moved from its engaged position to its first disengaged position.

7. The tool holder of claim 6 wherein said key is displaced away from said slanted surface when the detent mechanism is moved from its engaged position to its second disengaged position.

8. The tool holder of claim 7 wherein said sleeve includes a recess having a conical section and a cavity extending rearwardly from said conical section.

9. The tool holder of claim 8 wherein said conical section includes a slanted face that prevents displacement of said key away from said slanted surface when said sleeve is in its locked position.

10. The tool holder of claim 7 wherein said cavity is moved into operative engagement with said key when said sleeve is displaced into its unlocked position to accommodate said key when said detent mechanism is in its second disengaged position.

11. The tool holder of claim 5 wherein said sleeve is displaced toward said forward end of said socket to move said sleeve from its locked position to its unlocked position.

12. A rotatable tool comprising:

a bit having a non-circular outer connector surface; and a tool holder having a socket and a retaining mechanism, said socket having a forward end and an opening extending rearwardly from said forward end, said opening having a non-circular cross section, said bit being disposable in an operative position within said socket wherein said opening receives said connector surface to couple said bit for rotation with said tool socket, said retaining mechanism including:

a detent mechanism movable between an engaged position and first and second disengaged positions, said bit displacing said detent mechanism into its first disengaged position during insertion of the bit into its operative position, said detent mechanism extending into said opening to engage the bit and prevent axial removal of the bit from the opening when said detent mechanism is in its engaged position and the bit is in its operative position, said bit displacing said detent mechanism into its second disengaged position during removal of the bit from its operative position, said detent mechanism including a spring biasing said detent mechanism into its engaged position, a sleeve displaceable axially along said socket between a locked position and an unlocked position, said sleeve preventing movement of said detent mechanism from its engaged position into its second disengaged position while permitting movement of said detent mechanism from its engaged position into its first disengaged position when said sleeve is in said locked position, said sleeve permitting movement of said detent mechanism from its engaged position to its second disengaged position when said sleeve is in said unlocked position, and a spring normally biasing said sleeve into said locked position.

13. The rotatable tool of claim 12 wherein said bit is a reversible bit assembly including a bit holder, a first bit coupled to said bit holder to extend therefrom in a first direction, a second bit coupled to said bit holder to extend therefrom in a second direction opposite said first direction.

14. The rotatable tool of claim 12 wherein said bit includes a shank having a groove, said detent mechanism engaging said groove when said bit is in its operative position and said detent mechanism is in its engaged position.

15. The rotatable tool of claim 12 wherein said sleeve is displaced toward said forward end of said socket to move said sleeve from its locked position to its unlocked position.

* * * * *